United States Patent [19]

Davis

[11] 4,438,983
[45] Mar. 27, 1984

[54] LOW FRICTION PIVOT
[75] Inventor: Roland O. Davis, Santa Ynez, Calif.
[73] Assignee: Santa Barbara Research Center, Goleta, Calif.
[21] Appl. No.: 295,053
[22] Filed: Aug. 21, 1981
[51] Int. Cl.³ ............................................. F16C 11/12
[52] U.S. Cl. ..................................... 308/2 A; 403/291
[58] Field of Search ............... 308/2 A, 2 R, 21, 6 R, 308/173, 177; 403/291

[56] References Cited

U.S. PATENT DOCUMENTS 3,471,668 10/1969 Wilkes ................................. 308/6 R
4,000,659 1/1977 Li ......................................... 308/2 A
4,267,608 5/1981 Bora ..................................... 403/291

Primary Examiner—Lenard A. Footland
Attorney, Agent, or Firm—J. Dennis Moore; W. J. Bethurum; A. W. Karambelas

[57] ABSTRACT

Low friction pivot 10 has base 12 and pivot pin 16. Bands 22, 24, and 26 are secured to the base 12 on one end and half-wrapped around the cylindrical pivot pin 16 on the other end. The slot 18 in pin 16 is for receiving and clamping that end of the bands. The torque caused by the bent bands is equal so that in any rotative position there is no net torque applied to pin 16.

5 Claims, 6 Drawing Figures

LOW FRICTION PIVOT

BACKGROUND OF THE INVENTION

This invention is directed to a low friction pivot, particularly a pivot which has no sliding motion and thus does not require lubrication.

Pivot structures are well known, and most machinery requires the rotation of one member with respect to another. Bearings are highly developed in the art, and the most common bearing structure is where a cylindrical pin rotates within a corresponding bearing surface. Lubrication is required in the ordinary installation, and where high rotative speeds are achieved there is no metal to metal contact because of the hydrodynamic forces which separate the relatively moving parts. In order to overcome the relative sliding motion, antifriction bearings have been developed. These antifriction bearings have balls therein running in races, or have cylindrical or conical rollers therein operating between races. Since there is a small amount of rubbing in such bearings, due to deflections under load, lubrication is required to obtain a reasonable life. Lubrication produces problems, particularly in installations which are intended to operate at temperature extremes. At very low temperatures, the hydrocarbon type of oil and grease becomes hard. At very high temperatures, such lubricants vaporize. Specialized lubricants have been developed to extend the temperature operating range of such bearings, but such do not satisfy all the requirements. Some installations operate in vacuum, and such absence of atmospheric pressure gives further rise to lubrication difficulties. However, where continuous rotation is required, the installation must be designed so that those problems are not overwhelming. Such rotating shaft structures also have the problem of rotating friction. At high speeds, hydrodynamic lubrication eliminates metal to metal rubbing contact and thus the drag problems are mostly related to the shear in the lubricant. However, in slowly rotating pivots the starting drag can seriously hinder linearity of motion.

In rotating structures where very limited rotation is required, the bending of a structure can be employed to permit the rotation. Examples of such a structure are found in the following U.S. Pat. Nos. Re. 30,290; 3,288,541; 3,384,424; 3,575,475; 3,597,938; 3,700,289 and 3,811,172. These patents are rather accumulative in their teaching and teach that very limited rotational motion of one member with respect to another may be accomplished by the bending of metal. One particular teaching of each of these patents is that the webs in bending all operate in the same rotary direction and apply a resilient restoring force toward the zero, non-flexure postion. Thus, the employment of such structures is limited to uses wherein the angular rotation is very small and wherein a large restoring force can be tolerated.

SUMMARY OF THE INVENTION

In order to aid in the understanding of this invention it can be stated in essentially summary form that it is directed to a low friction pivot wherein the pivot pin has a circular section around the pivot axis. A plurality of bands is provided, with one end of each clamped onto the pivot pin and the other clamped to the base. The bands are resilient and rotation of the pivot pin with respect to the base, causes winding of at least one band and unwinding of at least one other band to permit balancing of the band winding forces.

It is thus a purpose and advantage of this invention to provide a low friction pivot structure wherein flexure bands wind and unwind from a pivot pin during its rotation to permit balancing of band forces. It is a further purpose to provide a low friction pivot which has a plurality of bands attaching the pivot pin to a base, with the bands winding and unwinding from the pivot pin and with a sufficient length of band to provide a substantial rotation of the pivot pin. It is another purpose to provide a low friction pivot which has flexure bands therein which are equally stressed in opposite directions and which are stressed to a maximum limit as a function of the pivot pin diameter so that further rotation of the pivot structure does not cause further band stress.

Other purposes and advantages of this invention will become apparent from a study of the following portion of this specification, the claims and the attached drawings.

DESCRIPTION OF THE PREFERRED EMBODIMENTS

Figure 1:
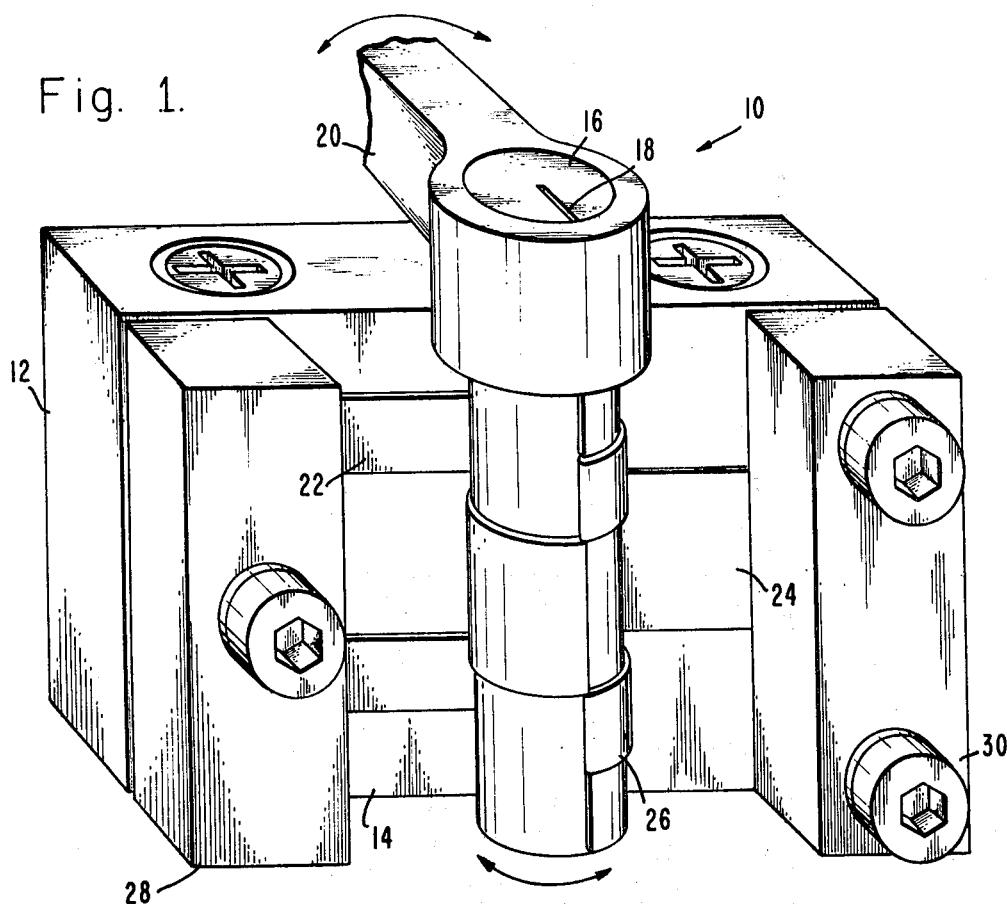
FIG. 1 as a perspective view of the first preferred embodiment of the low friction pivot of this invention.
Figure 2:
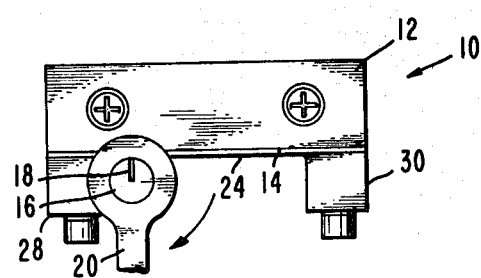
FIG. 2 as a plan view on a reduced scale of the structure of FIG. 1, showing it in a first limit position.
Figure 3:
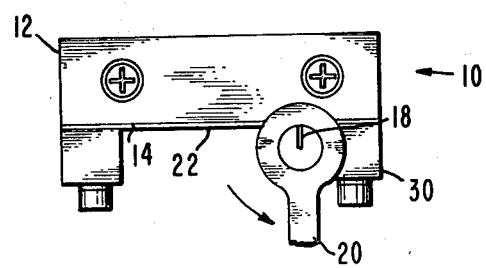
FIG. 3 is similar to FIG. 2, showing the low friction pivot in a second limit position.

The first preferred embodiment of the low friction pivot of this invention is generally indicated at 10 in FIGS. 1, 2, and 3. The low friction pivot structure illustrated in those figures comprises a base 12 which has a flat front surface 14. Base 12 may be secured to another member, or may be in itself the member with respect to which pivot pin support and rotation is desired.

Pivot pin 16 is a cylindrical pin having a central axis, upright in FIG. 1 and perpendicular to the sheet in FIGS. 2 and 3. Pivot pin 16 has a longitudinal slot 18 therein which is illustrated as being radial and parallel to the axis, and may extend to the axis as illustrated. Arm 20 is secured to pivot pin 16 and represents the structure which is required to be rotatively mounted with respect to base 12. Arm 20 may carry any structure thereon which is a rotatable part of the instrument or machine of which pivot 10 is a portion.

Pivot pin 16 is supported with respect to base 12 by means of three bands 22, 24, and 26. These bands are portions of the band system. Bands 22, 24, and 26 are thin resilient bands and for a long lasting structure are of such material and such thickness that when wound around the exterior of pin 16, their fatigue limit is not exceeded. This data is well known for various materials and the engineering calculations by which the thickness of the bands is calculated are well known. The outer ends of bands 22 and 26 are clamped to surface 14 by means of clamp block 28 and the outer end of band 24 is clamped to surface 14 by means of clamp block 30. The inner ends of the bands are wound a half a turn around pivot pin 16 when it is in its central position shown in FIG. 1, and are inserted into longitudinal slot 18. The bands preferably each have a preformed 90° hook thereon for this attachment. In the central position, when longitudinal slot 18 points directly away from and is perpendicular to surface 14, pivot pin 16 can rotate substantially 180° in either direction. These limits are illustrated in FIGS. 2 and 3. Clamp blocks 28 and 30 also act as limit stops for rotation.

In view of the fact that pivot pin 16 is spaced from surface 14 by means of the bands, it is preferable that the bands each have the same thickness. However, physical stability could still be achieved if bands 22 and 26 were the same thickness and band 24 somewhat thinner. It is an essential and critical part of this invention that the torque applied by the bands onto the pivot pin 16 be equal and opposite. For ease of achieving this result, the bands are preferably all of the same thickness and are of the same material, and the bands 22 and 26 are each half the width of band 24. That is the preferred embodiment, but it can be appreciated that torque balancing can be achieved even with different band materials, different band thicknessess and different band widths, providing these factors are all balanced to provide the net zero torque on pivot pin 16. The band material must have a high Young's modulus of elasticity to provide machanical security to the pivot pin and under those circumstances it is even more important that the bending forces be balanced. Furthermore, while three bands are illustrated it is appreciated that more bands could be applied. This is particularly the case where a long pivot pin 16 is part of the mechanism, and it may have a pair of bands at each end thereof to provide maximum stability.

Figure 4:
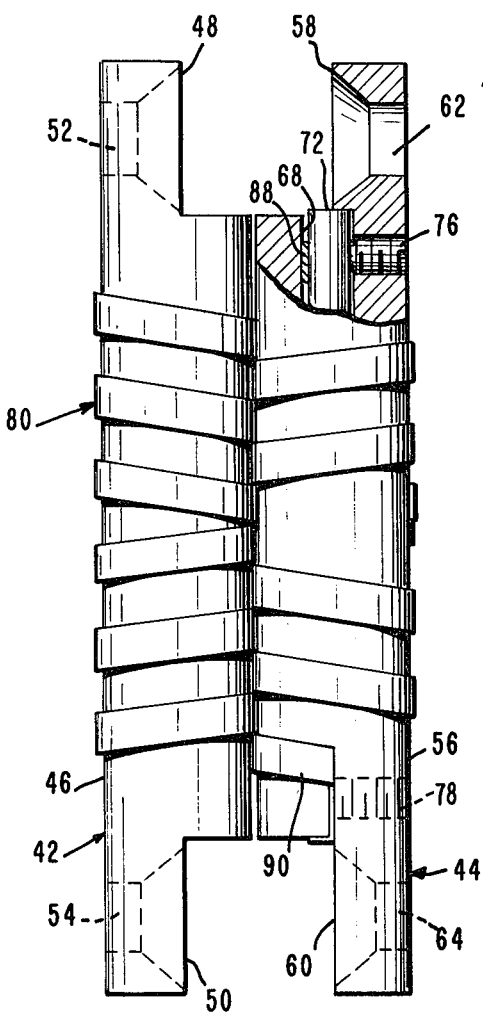
FIG. 4 is a front elevational view, with parts broken away and parts taken in section, of a second preferred embodiment of the low friction pivot of this invention.
Figure 6:
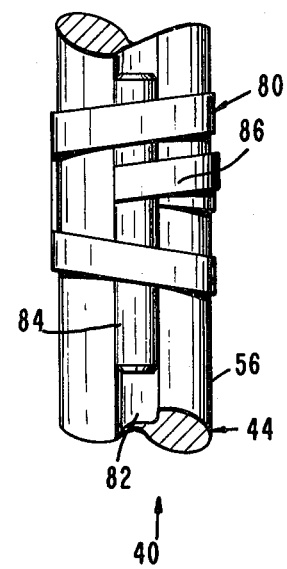
FIG. 6 is a side elevational view, with parts broken away, of the structure of FIG. 4.
Figure 5:
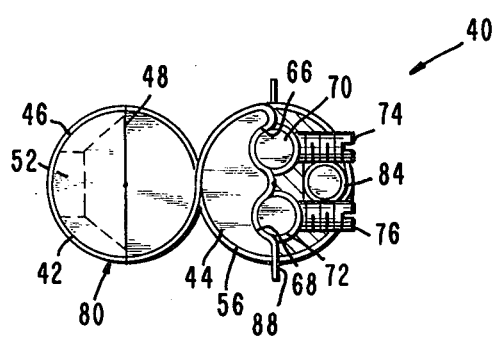
FIG. 5 is a plan view, with parts broken away and parts taken in section, of the structure of FIG. 4.

The preferred embodiment of the low friction pivot of this invention shown in FIGS. 4, 5 and 6 is generally indicated at 40. The low friction pivot structure 40 has two cylindrical body members 42 and 44 of structure similar to each other. For convenience in reference, one of the body members can be secured as a base and the other can act as a pivot pin. In this example, cylindrical body member 42 is considered a base and cylindrical body member 44 is considered a pivot pin, although the functions can be reversed. Base 42 has an outer surface 46 which is cylindrical about an upright axis in FIG. 4. Flats 48 and 50 are milled across the diameter and attachment screw holes 52 and 54 are provided so that screws can attach the base to some supporting structure. On the other hand, base 42 may be an integral part of a structure of which the low friction pivot is a structural part.

Pivot pin 44 is of similar construction. It has an outer surface 56 which is cylindrical about an axis parallel to the axis of base 42. Pivot pin 44 also has flats 58 and 60 through which are provided attachment screw holes 62 and 64. By such attachment screws pivot pin 44 may be attached to the moving portion of the machine or instrument of which it is a moving part. On the other hand, pin 44 may form a structural part of that equipment.

In both the top and the bottom of pin 44 a pair of parallel holes are bored parallel to the axis. As seen in FIG. 5, holes 66 and 68 are bored in a diametric plane. Lock pins 70 and 72 are respectively positioned in those holes. The lock pins are loose with respect to the holes, but lock screws 74 and 76 are positioned in lock holes which intersect the pin holes so that the lock screws can press the lock pins sideways in their holes. The pair of lock pins 70 and 72 in the top of pivot pin 44 are shown in FIG. 5. A similar structure exits in the lower end of pivot pin 44. In fact, lock screw 78, which is part of the lower band lock structure, is shown in the lower portion of FIG. 4.

A single resilient band 80 is wound a plurality of times in FIG. 8 fashion around both base 42 and pivot pin 44. Groove 82 is formed longitudinally along the outer surface of pivot pin 44. Securement pin 84 engages around the center 86 of band 80 and retains the center within groove 82. From that position the upper half of band 80 is wound in figure eight fashion around both the body pin 42 and pivot pin 44 in the upper direction to terminate at upper end 88 which is clamped behind the lock pins 70 and 72. To secure the end 88, screw 76 first clamps the end 88 under lock pin 72 and then screw 74 presses the lock pin 70 against the band to tighten the band to the desired tension. The upper half of the band extends from its center 86 a half a turn in the counterclockwise direction around pin 44, then a turn in the clockwise direction around pin 42, then a turn in the counterclockwise direction around pin 44 and so forth up to the end 88 where the upper end of the band is locked. Similarly, the lower half of the band extends from its center 86 a half a turn in the counterclockwise direction around pin 44, then a full turn in the clockwise direction around pin 42, and then a full turn in the counterclockwise direction around pin 44. The turns continue one after the other, as shown in FIG. 4, until the lower end 90 is clamped behind its lock pins of the lower end of pivot pin 44. By first locking the lower lock pin closest to the band end, and then tightening the other lock pin, the band tension in the lower half can also be controlled.

From this structure it can be seen that pivot pin 44 can rotate around base 42 with the flexure of band 80. For convenience of construction, band 80 is of one piece and thus has the same material, width and thickness throughout its entire length. Base 42 and pivot pin 44 are the same diameter and under these circumstances, the bending forces in the band are equal. Thus, at no position between its terminal positions is there a net torque between the pivot pin and the base imposed by the bending of band 80.

The number of turns of the band 80 around both the base and pivot pin provides for a structural stability of the pivot pin with respect to its base. Only one turn around the base would be needed if an axially aligned identical pair of pivot pin 44 and base 42 is provided for this mechanical stability. The diameter of the base 42 and pivot pin 44, together with the thickness of band 80 and the fatigue limit of the material are appropiately interrelated so that continual pivoting of the pin does not cause early degradation through materials failure.

In the low friction pivot structure 10, pivot pin 16 has its axis translate linearly during the rotation of the pivot pin about its axis. In the low friction pivot pin structure 40, the pivot pin 44 has its axis rotate in a circle around the axis of base 42, while the pivot pin 44 rotates. The radius of the circle followed by the axis of pivot pin 44 is equal to the radius of base 42 plus the radius of pin 44 (which are preferably equal) plus the thickness of band 80. The translation of pivot pin 16 and the swinging of the axis of pivot pin 44 through a circular curve can either be incorporated into the mechanism and used to advantage in the design of the mechanism, or can be compensated by other structure.

This invention has been described in its presently contemplated best modes and it is clear that it is susceptible to numerous modifications, modes and embodiments within the ability of those skilled in the art and without the exercise of the inventive faculty. Accordingly, the scope of this invention is defined by this scope of the following claims.

What is claimed is:

1. A pivot structure comprising:
   a cylindrical base member;
   a cylindrical pivot pin member;
   band means comprising a band having a first portion and a second portion, with said first portion affixed to one of said cylindrical members and said second portion affixed to one of said cylindrical members, said band means having first and second portions respectively extending around one of said cylindrical members in a first direction and around the other of said cylindrical members in a second direction, said band means being a metallic band and the curved surface of said pivot pin and said base, and the thickness of said metallic band being such that said metallic band is not stretched beyond its fatigue limit, said first portion and said second portion of said band means being configured so that the bending forces said first and second band portions onto said pivot pin is substantially balanced.

2. A pivot structure comprising:
   a cylindrical base member;
   a cylindrical pivot pin member having an exterior surface;
   a band having a first portion and a second portion said first portion of said band being affixed to said base and said second portion of said band being affixed to said one of said members, said band extending around said pivot pin in a first direction and around said base in the opposite direction said portions of said band both being clamped to the same one of said cylindrical members for securing said said pivot pin to said base and for permitting limited rotary motion of said pivot pin with respect to said base, said band portions being metallic and the cylindrical base and said cylindrical pivot pin being of such curvature and the thickness of said metallic band being such that said metallic band does not stretch beyond its fatigue limit.

3. A pivot structure comprising:
   a cylindrical base member;
   a cylindrical pivot pin member having an exterior surface;
   a band having a first portion and a second portion, said first portion of said band being affixed to one of said members and said second portion of said band being affixed to one of said members, said band extending around said pivot pin in the first direction and around said base in the opposite direction;
   said affixation of said band being a clamp which comprises a bore within said cylindrical member and said band is positioned within said bore, a lock pin lying against said band within said bore and a lock screw retaining said lock pin against said band so that said band is clamped in place at each of its ends for securing said pivot pin to said base and for permitting limited rotary motion of said pivot pin with respect to said base, said band portions being metallic and the cylindrical base and said cylindrical pivot pin being of such curvature and the thickness of said metallic band being such that said metallic band does not stretch beyond its fatique limit.

4. A pivot structure comprising:
   a cylindrical base member;
   a cylindrical pivot pin member having an exterior surface;
   a single band having a first portion and a second portion extending around said pivot pin and said base, said first portion of said band being affixed to one of said members and said second portion of said band being affixed to said one of said members, said band extending around said pivot pin member in a first direction and around said base member in the opposite direction;
   said affixation of said band being a clamp which comprises a bore within said cylindrical member and said band is positioned within said bore, a lock pin lying against said band within said bore and a lock screw retaining said lock pin against said band so that said band is clamped in place at each of its ends for securing said pivot pin to said base and for permitting limited rotary motion of said pivot pin with respect to said base, said band portions being metallic and the cylindrical base and said cylindrical pivot pin being of such curvature and the thickness of said metallic band being such that said metallic band does not stretch beyond its fatique limit.

5. A pivot structure comprising:
   a cylindrical base member;
   a cylindrical pivot pin member having an exterior surface;
   a single band having a first portion and a second portion extending around said pivot pin and said base, said first portion of said band being affixed to one of said members and said second portion of said band being affixed to said one of said members, said band extending around said pivot pin in the first direction and around said base in the opposite direction for securing said pivot pin to said base and for permitting limited rotary motion of said pivot pin with respect to said base, said band portions being metallic and the cylindrical base and said cylindrical pivot pin being of such curvature and the thickness of said metallic band being such that said metallic band does not stretch beyond its fatique limit.

* * * * *